United States Patent
Halberstadt et al.

(10) Patent No.: US 9,558,260 B1
(45) Date of Patent: Jan. 31, 2017

(54) ESTABLISHING GOVERNANCE RULES OVER DATA ASSETS

(71) Applicant: International Business Machines Corporation, Armonk, NY (US)

(72) Inventors: Benjamin D. Halberstadt, Jerusalem (IL); Roger K. Hecker, Efrat (IL); Ortal Nizri, Jerusalem (IL); Shlomo Steinhart, Ramat Bet Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/014,329

(22) Filed: Feb. 3, 2016

Related U.S. Application Data

(63) Continuation of application No. 14/929,510, filed on Nov. 2, 2015.

(51) Int. Cl.
  *G06F 7/00* (2006.01)
  *G06F 17/00* (2006.01)
  *G06F 17/30* (2006.01)

(52) U.S. Cl.
  CPC ... *G06F 17/30604* (2013.01); *G06F 17/30598* (2013.01)

(58) Field of Classification Search
  CPC .................... G06F 17/30598; G06F 17/30604
  USPC .......................................................... 707/694
  See application file for complete search history.

(56) References Cited

U.S. PATENT DOCUMENTS

| | | | |
|---|---|---|---|
| 8,700,577 B2 | 4/2014 | Yeh et al. | |
| 2009/0063534 A1 | 3/2009 | Halberstadt | |
| 2010/0114628 A1 | 5/2010 | Adler et al. | |
| 2011/0066602 A1 | 3/2011 | Studer et al. | |
| 2012/0102007 A1 | 4/2012 | Ramasubramanian et al. | |
| 2013/0031044 A1* | 1/2013 | Miranda ................ G06N 5/025 706/47 |

FOREIGN PATENT DOCUMENTS

WO 2007038231 A2 4/2007

OTHER PUBLICATIONS

Chiang et al., "Discovering Data Quality Rules", VLDB '08, Aug. 24-30, 2008, Auckland, New Zealand, Copyright 2008 VLDB Endowment, ACM, 12 pages.
Appendix P.: List of Patents or Patent Applications Treated as Related, 2 pages.
U.S. Appl. No. 14/929,510, Entitled "Establishing Governance Rules Over Data Assets", filed Nov. 2, 2015, IBM.
List of IBM Patents or Patent Applications Treated as Related, Appendix P, Filed Herewith, 2 pages.
Halberstadt, et al., "Establishing Governance Rules Over Data Assets", U.S. Appl. No. 15/014,329, filed Feb. 3, 2016.

* cited by examiner

*Primary Examiner* — Van Oberly
(74) *Attorney, Agent, or Firm* — Lance I. Hochhauser

(57) ABSTRACT

Transform governance rules for a data asset to apply to a set of related data assets. Establishing a governance rule over a first data asset based on a second governance rule applied to either an upstream or a downstream data asset.

1 Claim, 3 Drawing Sheets

500

```
TraverseEdges(CurrentNode)
        if(HasVisited(CurrentNode))          ← 510
                return;
        for each Edge of CurrentNode
                for each NextNode of Edge
                        if (HasRule(CurrentNode))
                                ApplyRule(CurrentNode, Edge, NextNode);
                        TraverseEdges(NextNode);
        return;
```

Fig. 5

ESTABLISHING GOVERNANCE RULES OVER DATA ASSETS

BACKGROUND

The present invention relates generally to the field of data processing, and more particularly to data integrity.

Data assets are used to run operational systems of businesses. Businesses employ governance rules to ensure that data assets comply with external and/or internal regulations. For example, in banking, external regulations come from voluntary agreements (the Third Basel Accord, or Basel III) or government agencies (FDIC regulations), and internal regulations come from a variety of standards and practices put in place by a management group of a business such as exceeding external regulations or supplementing external regulations (e.g., personnel, physical security). To comply with both internal and external regulations, businesses employ a variety of governance rules (sometimes also called data rules).

Applying governance rules to data assets can be manually intensive. Application of governance rules can also include a variety of errors. To apply a governance rule, all data assets under the governance rule must be located, data within the data assets must be understood, and the governance rule must be applied correctly to the data assets. Generally, these abilities are not centrally located and various knowledge bases must be combined.

SUMMARY

According to an aspect of the present invention, there is a method, computer program product, and/or system that performs the following operations (not necessarily in the following order): (i) determining a relationship between a first data asset and a second data asset; (ii) determining a first governance rule applied to the first data asset; and (iii) transforming the first governance rule, into a second governance rule, based on the relationship between the first data asset and the second data asset. At least determining a relationship between a first data asset and a second data asset is performed by computer software running on computer hardware.

BRIEF DESCRIPTION OF THE DRAWINGS

FIG. 5 is a screenshot showing a pseudocode according to a third embodiment of a system according to the present invention.

DETAILED DESCRIPTION

Figure 1:
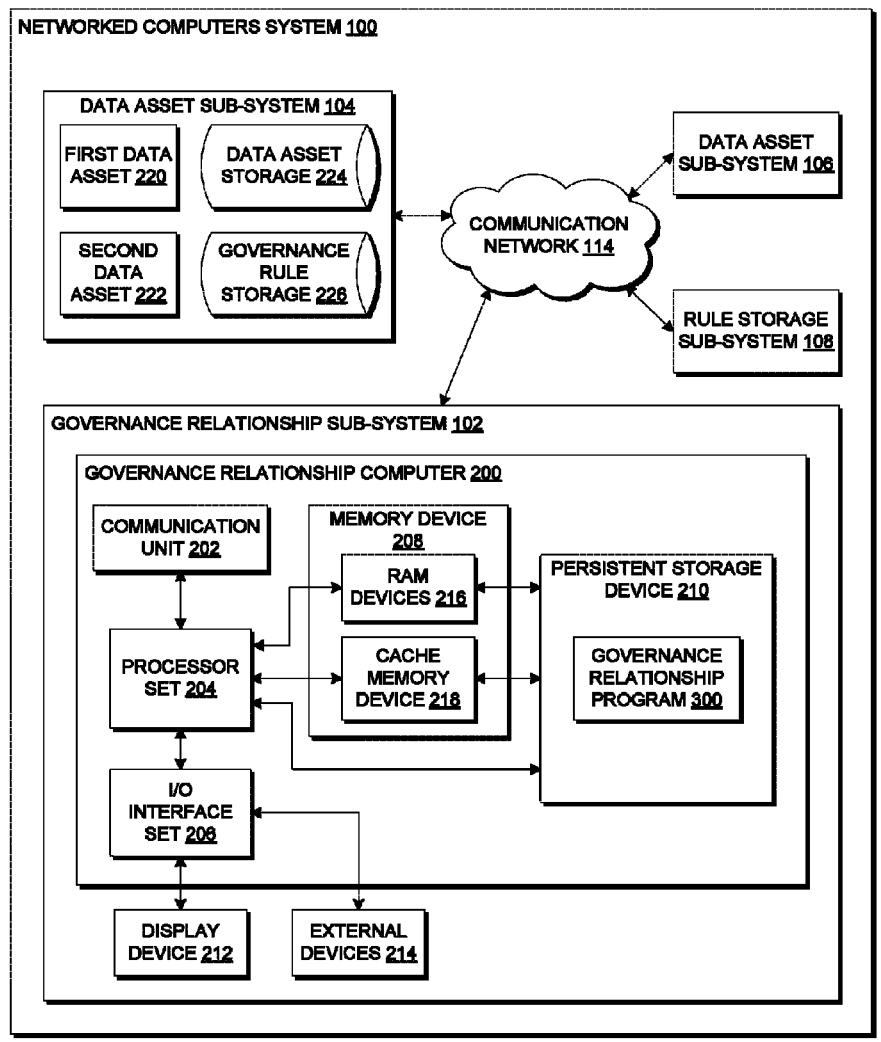
FIG. 1 is a block diagram view of a first embodiment of a system according to the present invention.

Transform governance rules for a data asset to apply to a set of related data assets. Establishing a governance rule over a first data asset based on a second governance rule applied to either an upstream or a downstream data asset. This Detailed Description section is divided into the following sub-sections: (i) Hardware and Software Environment; (ii) Example Embodiment; (iii) Further Comments and/or Embodiments; and (iv) Definitions.

I. HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: governance relationship sub-system 102; data asset sub-systems 104, 106; rule storage sub-system 108; and communication network 114. Governance relationship sub-system 102 contains: governance relationship computer 200; display device 212; and external devices 214. Governance relationship computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: governance relationship program 300. Data asset sub-system 104 contains: first data asset 220; second data asset 222; data asset storage 224; and governance rule storage 226.

Governance relationship sub-system 102 is, in many respects, representative of the various computer sub-systems in the present invention. Accordingly, several portions of governance relationship sub-system 102 will now be discussed in the following paragraphs.

Governance relationship sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Governance relationship program 300 is a collection of machine readable instructions and/or data that is used to create, manage, and control certain software functions that will be discussed in detail, below, in the Example Embodiment sub-section of this Detailed Description section.

Governance relationship sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between governance relationship sub-system 102 and client sub-systems.

Governance relationship sub-system 102 is shown as a block diagram with many double arrows. These double arrows (no separate reference numerals) represent a communications fabric, which provides communications between various components of governance relationship sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for governance relationship sub-system 102; and/or (ii) devices external to governance relationship sub-system 102 may be able to provide memory for governance relationship sub-system 102.

Governance relationship program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Governance relationship program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to governance relationship sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with governance relationship computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., governance relationship program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
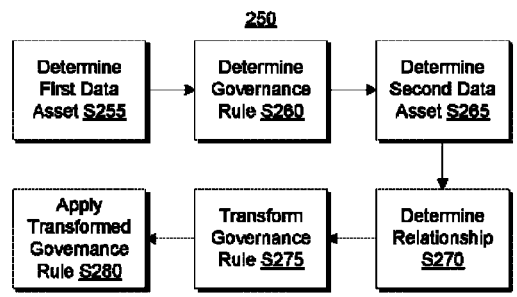
FIG. 2 is a flowchart showing a first embodiment method performed, at least in part, by the first embodiment system.
Figure 3:
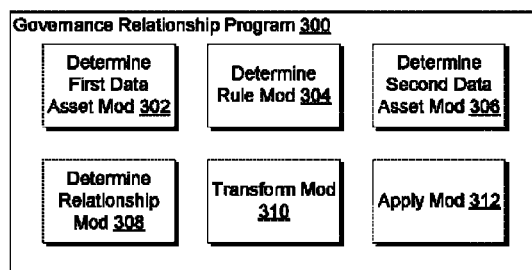
FIG. 3 is a block diagram view of a machine logic (e.g., software) portion of the first embodiment system.

FIG. 2 shows flowchart 250 depicting a method according to the present invention. FIG. 3 shows governance relationship program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, John is performing a scientific experiment wherein a thermometer records water temperatures in degrees Fahrenheit, but a later step requires water temperatures in degrees Celsius.

Processing begins at operation S255, where determine first data asset module ("mod") 302 determines a first data asset. A data asset is sometimes also called a node or a data set. A first data asset is sometimes also called a current node. A data asset can be a set of related data that is manipulated to determine a result. The use of "first" to describe a first data asset does not indicate a relative position of the first data asset in a grouping of data assets; "first" is used merely to distinguish a first data asset from other data assets. For example, a "first" data asset can be an upstream data asset as compared to a "second" data asset; however, a "first" data asset can also be a downstream data asset as compared to a "second" data asset. In some embodiments of the present invention, determine first data asset mod 302 determines a first data asset is stored in data asset storage 224. In this example, determine first data asset mod 302 determines first data asset 220 is a record of water temperatures, recorded in degrees Fahrenheit.

Processing proceeds to operation S260, where determine rule mod 304 determines a governance rule for a first data asset. A governance rule is a restriction of a data asset. A governance rule is sometimes also called a data quality rule or a first governance rule. In some embodiments of the present invention, a governance rule is a range to which data in a data asset must conform. Alternatively, a governance rule indicates a different restriction on a data asset including, but not limited to: (i) determining a datum is not null; (ii) determining a datum conforms to a format; (iii) determining a datum is selected from a defined group; (iv) determining a datum is within a range of values; (v) determining a datum contains allowed characters; and/or (vi) determining a datum conforms to a format requiring special treatment (e.g., a social security number, a credit card number). In some embodiments of the present invention, determine rule mod 304 determines a governance rule from metadata associated with a first data asset. Alternatively, determine rule mod 304 determines a governance rule based, at least in part, on a stored governance rule. In some embodiments of the present invention, a governance rule is stored in a location local to a first data asset. Alternatively, a governance rule is stored in a location remote from a first data asset; for example, a first data asset is stored on data asset sub-system 106, and a governance rule is stored on rule storage sub-system 108. In this example, determine rule mod 304 determines that a data governance rule is stored in governance rule storage 226. Determine rule mod 304 determines that the governance rule restricts data in the first data asset to values between 32 and 212 (i.e., 32 degrees Fahrenheit and 212 degrees Fahrenheit). This is because the thermometer is measuring the temperature of water.

Processing proceeds to operation S265, where determine second data asset mod 306 determines a second data asset. The use of "second" to describe a second data asset does not indicate a relative position of the second data asset in a grouping of data assets; "second" is used merely to distinguish a second data asset from other data assets. A second data asset is sometimes also called a next node. In some embodiments of the present invention, determine second data asset mod 306 determines a second data asset is stored in data asset storage 224. In this example, determine second data asset mod 306 determines second data asset 222 is a record of water temperatures, recorded in degrees Celsius.

Processing proceeds to operation S270, where determine relationship mod 308 determines a relationship between a first data asset and a second data asset. A relationship between two data assets is sometimes also called an edge. In some embodiments of the present invention, a relationship between a first data asset and a second data asset is one of: (i) a direct-write relationship (i.e., the second data asset writes to the first data asset); (ii) an indirect-write relationship (i.e., the second data asset propagates write commands, through one or more intervening data assets, to the first data asset); (iii) a direct-read relationship (i.e., the second data asset reads from the first data asset); or (iv) an indirect-read relationship (i.e., the second data asset propagates read commands, through one or more intervening data assets, to the first data asset). In this example, determine relationship mod 308 determines that second data asset 222 has a direct-read relationship with first data asset 220.

Processing proceeds to operation S275, where transform mod 310 transforms a governance rule. Transform mod 310 transforms a governance rule into a transformed governance rule (sometimes also called a second governance rule) based, at least in part, on a relationship between a first data asset and a second data asset. In some embodiments of the present invention, transform mod 310 determines how a relationship between a first data asset and a second data asset transforms a governance rule to a transformed governance rule. In some embodiments of the present invention, transform mod 310 determines how an indirect relationship transforms a governance rule to a transformed governance rule. In some embodiments of the present invention, transform mod 310 performs an extract, transform, load process. In some embodiments of the present invention, an extract, transform, load process includes extracting a governance rule, transforming the governance rule into a transformed governance rule, and loading the transformed governance rule. In some embodiments of the present invention, transform mod 310 extracts a governance rule from a governance rule storage. In some embodiments of the present invention, transform mod 310 extracts a governance rule from a relationship between a first data asset and a second data asset. In some embodiments of the present invention, transform mod 310 extracts a governance rule from a first data asset. In some embodiments of the present invention, transform mod 310 loads a governance rule to a governance rule storage. In some embodiments of the present invention, transform mod 310 loads a governance rule to a relationship between a first data asset and a second data asset. In some embodiments of the present invention, transform mod 310 loads a governance rule to a second data asset. In some embodiments of the present invention, transform mod 310 saves a transformed governance rule to governance rule storage 226.

In this example, transform mod 310 determines that data in first data asset 220 is converted to data in second data asset 222 by: first, subtracting 32; and, second, dividing by 1.8. Therefore, transform mod 310 transforms the governance rule, restricting first data asset 220 to a range of 32 to 212, into transformed governance rule, restricting second data asset 222 to a range of 0 to 100 (i.e., 0 degrees Celsius to 100 degrees Celsius). Alternatively, if a first data asset is in degrees Celsius and a second data asset is in degrees Fahrenheit, transform mod 310 transforms a governance rule by: first, multiplying by 1.8; and, second, adding 32.

In an alternative example, a first data asset is a downstream data asset and a second data asset is an upstream data asset. The second data asset has an indirect-write relationship with the first data asset. Each of the first data asset and second data asset represent dates. The first data asset is a number representing a number of days after a known date; the second data asset is a date in a written format (e.g., Jan. 1, 2016). Data in the second data asset is received as an input and is converted to data in an intermediate data asset, numerical representations of written dates. Data in the intermediate data asset is converted to data in the first data asset. The governance rule restricts the first data asset to dates after the known date. Therefore, transform mod 310 transforms the governance rule into the transformed governance rule by transforming the number representing the known date (e.g., 0) into a numerical representation of the date (e.g., 5845), then transforming the numerical representation of the date into a written date (e.g., Jan. 1, 2016). Therefore, the transformed governance rule restricts the second data asset to dates after Jan. 1, 2016.

Processing terminates at operation 5280, where apply mod 312 applies a transformed governance rule to a second data asset. In some embodiments of the present invention, apply mod 312 restricts data in a second data asset based, at least in part, on a transformed governance rule. In some embodiments of the present invention, restricting data based, at least in part, on a transformed governance rule includes deleting and/or eliminating data in a second data asset that violates the transformed governance rule. In some embodiments of the present invention, restricting data based, at least in part, on a transformed governance rule includes not permitting new data that violates the transformed governance rule.

III. FURTHER COMMENTS AND/OR EMBODIMENTS

Some embodiments of the present invention recognize the following facts, potential problems, and/or potential areas for improvement with respect to the current state of the art: (i) data stewards maintaining data assets are prone to mistakes; (ii) maintenance of data assets (sometimes also called data records) is time intensive; and/or (iii) maintenance of data assets is resource intensive.

Figure 4:
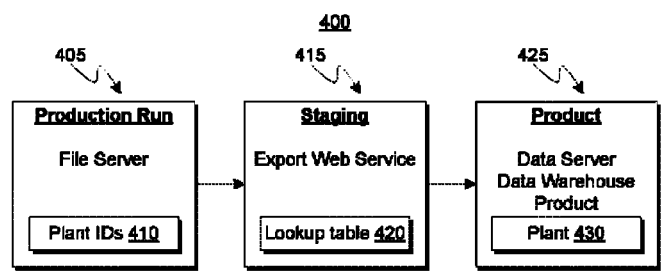
FIG. 4 is a screenshot showing a data lineage graph according to a second embodiment of a system according to the present invention.

FIG. 4 depicts a screenshot of data lineage graph 400. Data lineage graph 400 contains: production run 405; staging 415; and product 425. Data lineage graph 400 depicts a flow of a datum from a first data asset to a second data asset. The first data asset in data lineage graph 400 is production run 405. Production run 405 is a table containing various data, including a plant identifications (IDs) 410, a column in the table. The second data asset in data lineage graph 400 is product 425. Product 425 is also a table containing various data, including plant 430, a column in the table. Staging 415 is an export web service that reads data from plant IDs 410 and writes data to plant 430. Staging 415 also contains lookup table 420. Lookup table 420 is a table that contains an association between various plant IDs and associated plant names. In this example, plant IDs 410 contains a numerical representation of various plants (e.g., 1, 2, etc.). Staging 415 reads the numerical representation in plant IDs 410, converts the plant ID to a plant name, and writes the plant name to plant 430. In this example, plant 430 contains a data quality rule (sometimes also called a data governance rule) that plant names must be one of: Oregon, Texas, or California. In lookup table 420: the plant ID for Oregon is 1; the plant ID for Texas is 2; and the plant ID for California is 3. Therefore, staging 415 applies the data quality rule to production run 405 and determines data read from plant IDs 410 must be one of 1, 2, or 3.

In some embodiments of the present invention, a governance relationship sub-system employs recursive tracing of nodes and/or edges to determine relationships among various nodes. In some embodiments of the present invention, a governance relationship sub-system employs computer code based, at least in part, on a pseudo code. One example of pseudo code used by a governance relationship sub-system is shown in Table 1.

FIG. 5 depicts screenshot 500 showing pseudocode 510. Pseudocode 510 is pseudocode for traversing edges. In this example, "CurrentNode" is a first data asset, "NextNode" is a related second data asset, and "Edge" is a relationship between "CurrentNode" and "NextNode." In some embodiments of the present invention, "Edge" is an ETL process. "TraverseEdges" is a recursive process that cascades (sometimes also called propagates) a governance rule from a first data asset to a second data asset, then determines if the rule should be cascaded to a third data asset. "TraverseEdges" takes a data asset as an argument. First, "TraverseEdges" check if the governance rule has already been applied to "CurrentNode" using "HasVisited." "HasVisited" is a process that determines if a data asset has already been processed and takes "CurrentNode" as an argument. If "CurrentNode" has been processed, "TraverseEdges" is completed and processing returns to the process that called "TraverseEdges." "TraverseEdges" then determines that "CurrentNode" has a set of "Edges" and a set of "NextNodes." If "CurrentNode" does not have a set of edges or if "CurrentNode" does not have a set of "NextNodes," "TraverseEdges" is completed and processing returns to the process that called "TraverseEdges." "TraverseEdges" then checks if "CurrentNode" has a governance rule using "HasRule." "HasRule" is a process that determines if a data asset has a governance rule. If "CurrentNode" does have a governance rule, "TraverseEdges" calls "ApplyRule." "ApplyRule" is a process that applies a governance rule from a first data asset to a second data asset. In some embodiments of the present invention, "ApplyRule" is an ETL process. "ApplyRule" takes three arguments: (i) "CurrentNode"; (ii) "Edge"; and (iii) "NextNode." "ApplyRule" takes the governance rule from "CurrentNode," transforms the governance rule using "Edge," then applies transformed governance rule to "NextNode." "TraverseEdges" then calls itself to cascade governance rules through the set of related data assets.

In some embodiments of the present invention, traversing an edge is a recursive manner of checking a set of nodes to determine relationships among the nodes. In some embodiments of the present invention, a governance relationship sub-system ensures nodes are not processed multiple times. In some embodiments of the present invention, a governances relationship sub-system applies a rule from a current node to a next node. In some embodiments of the present invention, a governance relationship sub-system applies a rule recursively over a lineage graph. In some embodiments of the present invention, a governance relationship sub-system displays a set of nodes as a lineage graph.

In some embodiments of the present invention, a data asset has a quality governance rule regarding format of data. In this example, a governance rule requires that ninety percent (90%) of data values in a data asset must be of the pattern "x@y," wherein each of "x" and "y" are non-null strings. A function of this type is sometimes called a concatenation function. In some embodiments of the present invention, a governance rule is applied to a concatenation function containing more than two arguments. To achieve the ninety percent quality required, a governance relationship sub-system applies the governance rule to the data assets "x" and "y." Various possible combinations exist for applying governance rules to "x" and "y," including, but not limited to: (i) one hundred percent (100%) of data values in data asset "x" must be non-null strings and ninety percent (90%) of data values in data asset "y" must be non-null strings; (ii) ninety percent (90%) of data values in data asset "x" must be non-null strings and one hundred percent (100%) of data values in data asset "y" must be non-null strings; and (iii) ninety-five percent (95%) of data values in data asset "x" must be non-null strings and ninety-five percent (95%) of data values in data asset "y" must be non-null strings. In some embodiments of the present invention, a governance relationship sub-system applies governance rules related to various concatenation functions to various data assets.

In some embodiments of the present invention, a governance rule relates to unit conversion. In this example, a governance rule requires temperatures in the range of 0 degrees Celsius to 100 degrees Celsius. To achieve the required data quality, a governance relationship sub-system applies an ETL process containing a conversion function, converting values from degrees Fahrenheit to degrees Celsius. The governance relationship sub-system applies the governance rule to the upstream data asset (the temperatures in degrees Fahrenheit), requiring that each value be in the range of 32 degrees Fahrenheit to 212 degrees Fahrenheit. In some embodiments of the present invention, a governance relationship sub-system applies governance rules related to various conversion functions to various data assets.

In some embodiments of the present invention, a governance rule relates to a lookup function. In this example, a governance rule requires a two letter country code selected from a group consisting of: DE, FR, UK, and US. For example, these countries are locations of manufacturing plants for a company. To achieve the required data quality, a governance relationship sub-system applies an ETL process containing a lookup function, to determine a corresponding numerical representation for each of the two letter country codes (e.g., DE is 1, FR is 2, UK is 3, and US is 4). The governance relationship sub-system applies the governance rule to the corresponding data asset, in which the numerical representations for each country are used, requiring that each value be selected from a group consisting of: 1, 2, 3, and 4. In some embodiments of the present invention, a governance relationship sub-system applies governance rules related to various lookup functions to various data assets.

In some embodiments of the present invention, a governance rule relates to a pivot function. In some embodiments of the present invention, a governance relationship sub-system uses a pivot function in combination with a conversion function and/or a lookup function. In this example, a company has employees in various countries around the world. On a data asset containing a list of all employees, the country of each employee, and the salary of each employee, a governance rule requires a salary to be of the format "$dddd.dd." Based, at least in part, on the country of the employee, a governance relationship sub-system applies an ETL function to pivot the salary column from various currencies to U.S. dollars. Additionally, based at least in part, on the country of the employee, a governance relationship sub-system applies an ETL function to pivot the governance rule format of "$dddd.dd" to various other currencies (e.g., € eeee.ee, £ pppp.pp, etc.). In some embodiments of the present invention, a governance relationship sub-system takes a first data asset and converts it to a second data asset. For example, the first data asset is a table with the columns: name, salary, and country. A governance relationship sub-system converts this first data asset to a second data asset with the columns: name, salary in Germany, salary in France, salary in the United Kingdom, and salary in the United States.

In some embodiments of the present invention, a governance rule relates to a merge and join function. In some embodiments of the present invention, a governance relationship sub-system uses a merge and join function in combination with a concatenation function. In some embodiments of the present invention, a governance relationship sub-system uses a merge and join function to combine two data assets into a single data asset. For example, a first data asset is a table with the columns: name, age, email, and address; a second data asset is a table with the columns: name, credit rating, and orders. A governance relationship sub-system would apply a merge and join function to create a single data asset with the columns: name, age, email, address, credit rating, and orders. Additionally, if any of the names in the first data asset and the names in the second data asset match up those entries are combined.

In some embodiments of the present invention, a governance rule employs a combination of one or more of the above functions to apply a governance rule to a data asset.

Some embodiments of the present invention may include one, or more, of the following features, characteristics, and/or advantages: (i) reducing time required to establish data assets; (ii) reducing resources required to establish data assets; (iii) reducing time required to maintain data assets; (iv) reducing resources required to maintain data assets; and/or (v) reducing a likelihood of errors in maintaining data assets.

In some embodiments of the present invention, a data asset exists within a larger data flow. In some embodiments of the present invention, an upstream process describes an upstream data asset writing information to a downstream data asset. In some embodiments of the present invention, a downstream process describes an downstream data asset reading information from an upstream data asset.

Some embodiments of the present invention may include one, or more, of the following features, characteristics, and/or advantages: (i) an "extract, transform, load" (ETL) job; (ii) an ETL job reading from an operational system; (iii) an ETL job writing to a data warehouse; (iv) a data lifecycle management tool; (v) a data lifecycle management tool reading from a warehouse; and/or (vi) a data lifecycle management tool creating a set of test data.

Some embodiments of the present invention may include one, or more, of the following features, characteristics, and/or advantages: (i) a reporting cube; (ii) a reporting cube reading from a data mart; (iii) a reporting cube enabling data analytics; (iv) a data lineage graph; (v) a data lineage graph depicting a set of upstream processes; (vi) a data lineage graph depicting a set of upstream data assets; (vii) a data lineage graph depicting a set of downstream processes; (viii) a data lineage graph depicting a set of downstream data asset; (ix) a data lineage graph depicting upstream processes that write to a data asset; and/or (x) a data lineage graph depicting downstream processes that read from a data asset.

Some embodiments of the present invention may include one, or more, of the following features, characteristics, and/or advantages: (i) locating a data asset within a data lineage graph; (ii) locating a data asset with a governance rule; (iii) applying a governance rule to a downstream data asset; (iv) applying a governance rule to an upstream data asset; (v) examining a relationship between two data assets; (vi) transforming a governance rule; (vii) transforming a governance rule based, at least in part, on a relationship between two data assets; (viii) adjusting a governance rule based, at least in part, on a manipulation of a first data asset into a second data asset; and/or (ix) recursively applying governance rules to related data assets. In some embodiments of the present invention, recursive application of a governance rule involves applying a governance rule to a set of data assets, wherein each sequential data asset exists in a direct-read relationship with the prior data asset. In some embodiments of the present invention, recursive application of a governance rule involves applying a governance rule to a set of data assets, wherein each sequential data asset exists in a direct-write relationship with the prior data asset.

Some embodiments of the present invention may include one, or more, of the following features, characteristics, and/or advantages: (i) analyzing a data lineage; (ii) applying a governance rule to a data asset; (iii) moving data among a set of data assets; (iv) transforming data among a set of data assets; (v) scaling an ETL platform; (vi) applying a governance rule to a data asset; (vii) using a set of stages to create jobs; (viii) moving data from a source data asset to a target data asset; (ix) capturing a set of jobs involved in moving data; (x) capturing a set of data assets involved in moving data; and/or (xi) displaying jobs in a data lineage graph.

Some embodiments of the present invention may include one, or more, of the following features, characteristics, and/or advantages: (i) using a data lineage graph to find an upstream job from a data asset; (ii) using a data lineage graph to find a downstream job from a data asset; (iii) analyzing a set of stages of a job (sometimes also called a process); (iv) analyzing a set of stages of a job to understand a nature of the job; (v) analyzing a governance rule to understand a meaning of the governance rule; and/or (vi) deducing a governance rule for a related data asset in a data lineage graph.

Some embodiments of the present invention may include one, or more, of the following features, characteristics, and/or advantages: (i) defining a key attribute of a governance rule; (ii) determining a set of data assets having governance rules; (iii) invoking a lineage to create a data lineage graph; (iii) applying a pseudo code; and/or (iv) applying a pseudo code to process a data lineage graph. In some embodiments of the present invention, a key attribute of a governance rule is a quality rule. Alternatively, a key attribute of a governance rule includes, but is not limited to: (i) a security rule; and/or (ii) a lifecycle rule.

Some embodiments of the present invention may include one, or more, of the following features, characteristics, and/or advantages: (i) a data lineage graph consisting of a set of nodes (sometimes also called data assets); (ii) a data lineage graph consisting of a set of edges (sometimes also called relationships among data assets); (iii) a governance relationship sub-system tracing a data lineage graph; (iv) a governance relationship sub-system determining an upstream data asset to be governed; (v) a governance relationship sub-system determining a downstream data asset to be governed; (vi) a governance relationship sub-system determining a governance rule to be applied to fulfil a set of governance requirements; (vii) a governance relationship sub-system invoking a data lineage; and/or (viii) a governance relationship sub-system producing a data lineage graph.

Some embodiments of the present invention may include one, or more, of the following features, characteristics, and/or advantages: (i) finding a data lineage graph for a data asset; (ii) applying a governance rule to a data asset; (iii) applying a governance rule from a second data asset to a first data asset; (iv) applying a governance rule from a second data asset to a first data asset, based, at least in part, on a data lineage graph; (v) adapting a governance rule based, at least in part, on a transformation in a data lineage graph; and/or (vi) adapting a governance rule based, at least in part, on a transformation from a first data asset to a second data asset.

Some embodiments of the present invention may include one, or more, of the following features, characteristics, and/or advantages: (i) assigning governance rules to data assets in a regulatory report; (ii) invoking a data lineage for a data asset in a regulatory report; (iii) finding an ETL process for a data asset in a regulatory report; (iv) finding an upstream data asset in a regulatory report; (v) finding a downstream data asset in a regulatory report; (vi) analyzing an upstream ETL process in a regulatory report; (vii) analyzing a downstream ETL process in a regulatory report; (viii) adjusting a governance rule of a regulatory report; (ix) assigning an adjusted governance rule to an upstream asset; and/or (x) assigning an adjusted governance rule to an downstream asset.

Some embodiments of the present invention may include one, or more, of the following features, characteristics, and/or advantages: (i) adhering to financial regulations; (ii) adhering to banking regulations (e.g., Basel III); and/or (iii) reducing effort to adhere to regulations.

Some embodiments of the present invention may include one, or more, of the following features, characteristics, and/or advantages: (i) using data lineage to propagate data quality rules; (ii) using data lineage to transform data quality rules; (iii) using ETL analysis to determine a set of related assets; (iv) using data lineage graph analysis to determine a set of related assets; (v) modifying a set of related assets; (vi) modifying a set of governance rules; and/or (vii) determining a set of governance rules for a business.

Some embodiments of the present invention may include one, or more, of the following features, characteristics, and/or advantages: (i) maintaining a data lineage graph; (ii) maintaining a data lineage graph that identifies a set of related data assets; (iii) identifying a set of related data assets based on an upstream process; (iv) identifying a set of related data assets based on a downstream process; (v) applying a governance rule to a related data asset; (vi) applying a transformed governance rule (sometimes also called a modified governance rule) to a related data asset; (vii) determining a set of governance rules for a set of related assets; and/or (viii) determining a set of governance rules for a set of related assets, wherein each asset in the set of related assets is related to each other asset in the set of related assets.

IV. DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
    displaying a plurality of data assets from a data asset storage as a data lineage graph;
    determining a first relationship between a first data asset in the plurality of data assets and a second data asset in the plurality of data assets is a direct-read relationship;
    determining a first governance rule applied to the first data asset, wherein the first governance rule relates to a lookup function;
    transforming the first governance rule into a second governance rule based, at least in part, on the first relationship, wherein the second governance rule relates to a pivot function;
    applying the second governance rule to the second data asset;
    determining a second relationship between the second data asset and a third data asset in the plurality of data assets is an indirect-write relationship;
    transforming the second governance rule into a third governance rule based, at least in part, on the second relationship, wherein the third governance rule relates to a merge and join function;
    applying the third governance rule to the third data asset;
    identifying the first data asset, the second data asset, and the third data asset on the data lineage graph; and
    storing the first governance rule, the second governance rule, and the third governance rule to a governance rule storage;
    wherein:
        at least determining the first relationship between the first data asset and the second data asset is performed by computer software running on computer hardware.

* * * * *